Nov. 13, 1928.
A. ROSENTHAL
1,691,586
POWER CONTROL DEVICE
Filed Jan. 8, 1927
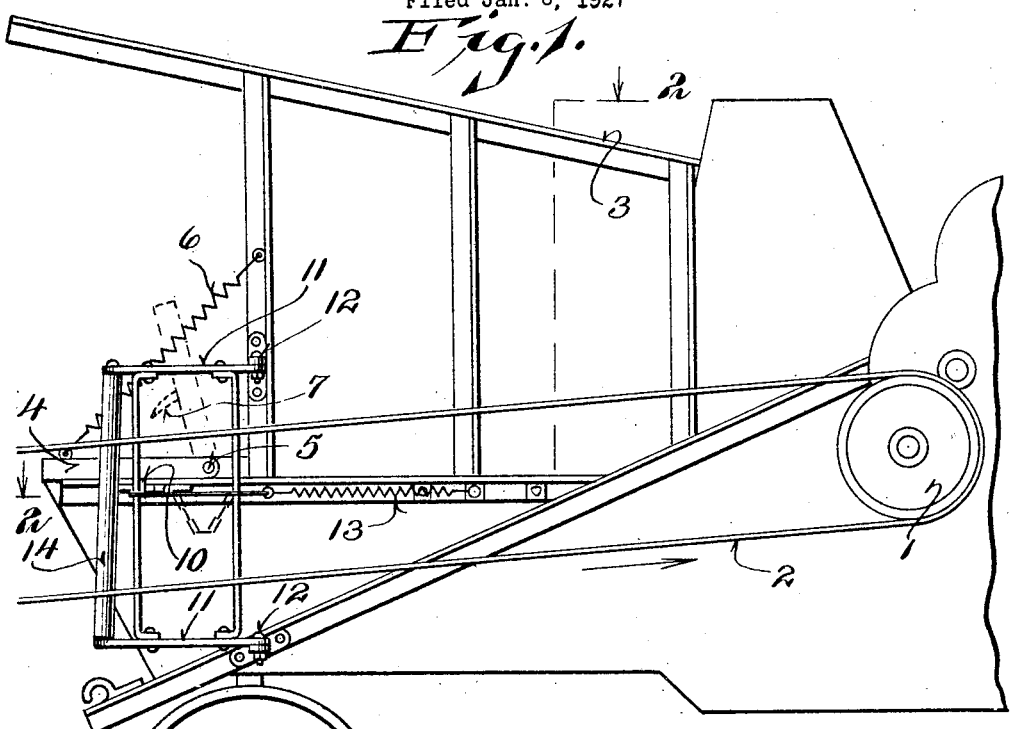
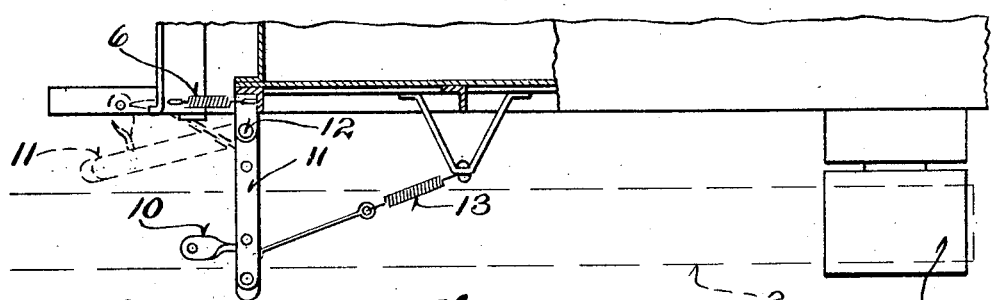
Inventor
August Rosenthal Patented Nov. 13, 1928.

1,691,586

UNITED STATES PATENT OFFICE.

AUGUST ROSENTHAL, OF WEST ALLIS, WISCONSIN, ASSIGNOR TO ROSENTHAL MFG. CO., OF WEST ALLIS, WISCONSIN.

POWER CONTROL DEVICE.

Application filed January 8, 1927. Serial No. 159,933.

This invention pertains to a safety power control device.

In certain machines, such as farm machines, for example, corn huskers, shredders, or other machines, it is desirable that the machine be stopped when the operator leaves his normal position, or any bystander becomes endangered by interfering with running parts of the machine in feeding, loading, or oiling, or in the event that machine parts break. For example, in the machines named, if the operator leaves his position and the machine continues to run while the operator attempts to inspect or adjust certain parts thereof, he is in serious danger of being injured.

This invention is designed to provide a power control device which is so constructed that it automatically stops the machine when the operator moves from his normal operative position. Further objects are to so construct and correlate the parts that the stopping of the machine or opening the connection from the source of driving power is effected automatically without thought on the part of the operator when he is in danger, or which may be intentionally initiated by the operator when he observes a bystander in danger or machine parts broken.

Further objects are to provide a device which may be applied to existent types of machines with a very simple change, and which is of sturdy, rugged and reliable construction.

An embodiment of the invention is shown in the accompanying drawings in which:

Figure 1 is a fragmentary side elevation of a corn husker with the mechanism applied thereto;

Figure 2 is a sectional view approximately on the line 2—2 of Figure 1;

Figure 3 is a sectional detail of the latching mechanism;

Figure 4 is a fragmentary view showing the relative position of the two stretches of the belt and of the belt shifter.

Referring to the drawings, it will be seen that the machine is provided in the instance chosen for illustration, with a driven pulley 1 supplied with power in any suitable manner, as by means of the belt 2. The machine is usually fed along a downwardly slanting top or chute 3 and the operator stands upon the operator's platform 4 while he is feeding the machine. This operator's platform is hingedly joined to a stationary portion of the machine, as indicated at 5, and a spring 6 tends to raise the platform. The tension of the spring is such that it will raise the platform to the dotted line position when the operator leaves the platform, but will be easily extended by the weight of the operator upon the platform.

This platform carries a prong or latch 7, as shown most clearly in Figure 3, and such prong may pass through the usual angle iron 8 on the machine. The prong also passes through an aperture formed in the guiding clip 9 for the latching tongue 10, such latching tongue being most clearly shown in Figure 2. The latching tongue is carried by means of a lever 11 pivoted as indicated at 12, and urged into the full line position, as shown in Figure 2, by means of the spring 13. This lever is, in reality, a composite structure, as may be seen from Figure 1. In reality, it is a frame work pivoted at the spaced points 12. This frame work is made relatively rigid and carries an elongated roller 14. This roller is adapted to engage the belt when the lever is rocked outwardly, as described hereinafter. It is to be noted that the belt travels in the direction indicated by the arrow in Figure 1, and from Figure 4 it will be apparent that as the lever rocks outwardly the roller will engage the leading side of the belt, or, in other words, the understretch of the belt in the form shown. This stretch of the belt may be more easily shifted and, consequently, the belt will be thrown off the driven pulley and the operative connection between the driving and driven means will thus be interrupted whenever the lever swings outwardly.

The lever, under normal conditions, is held in the dotted line position shown in Figure 2, and under these conditions, the latching ear 10 is engaged by the latch or prong 7 carried by the operator's platform 4. The platform is held in its lowered or normal position by the weight of the operator, but as soon as the operator leaves the platform, such platform rocks upwardly withdrawing the prong 7 from the ear 10. This releases the belt shifting lever 11 and, consequently, throws the belt from the driven pulley and interrupts the driving connection.

In this manner, it will be seen that an absolutely fool-proof construction has been provided by this invention, and one which operates automatically without thought on the part of the operator.

Although the invention has been described in considerable detail, such description is intended as illustrative rather than limiting as the invention may be variously embodied and as the scope of such invention is to be determined as claimed.

I claim:

1. In a corn husking machine, the combination of a belt driven pulley, a feeding trough, a pivotally mounted operator's platform positioned to provide easy access of the operator to said feeding trough, a spring urging said platform towards raised position, a prong carried by said platform, a pivotally mounted belt shifter provided with an elongated roller adapted to engage the belt, a spring urging said belt shifter to belt shifting position for throwing said belt from said pulley, and a catch carried by said belt shifter and normally engaged by the prong of the operator's platform, whereby when the operator leaves his platform said belt shifter will be unlatched and will throw the belt from the pulley.

2. In a corn husking machine, the combination of a belt driven pulley, a feeding trough, a pivotally mounted operator's platform positioned to provide easy access of the operator to said feeding trough, a spring urging said platform towards raised position, a prong carried by said platform, a pivotally mounted belt shifter provided with an elongated roller adapted to engage the belt, a spring urging said belt shifter to belt shifting position for throwing said belt from said pulley, and a catch carried by said belt shifter and normally engaged by the prong of the operator's platform, whereby when the operator leaves his platform said belt shifter will be unlatched and will throw the belt from the pulley, said roller being slantingly arranged for engaging the leading stretch of said belt.

3. The combination of a corn husker having a feeding trough and a driving pulley, an operator's platform pivotally mounted upon said machine and spring urged upwardly and located in a position to provide easy access of the operator to the feeding trough, a belt for said driving pulley, and a laterally shiftable member for throwing said belt off said pulley, a spring urging said member outwardly to belt throwing position, said laterally shiftable member being mounted adjacent said platform, and means carried by said platform and engaging said member and restraining said member against outward motion when said platform is depressed by the weight of the operator.

In testimony that I claim the foregoing I have hereunto set my hand at West Allis, in the county of Milwaukee and State of Wisconsin.

AUGUST ROSENTHAL.